(12) United States Patent
Shaheen

(10) Patent No.: US 10,863,402 B2
(45) Date of Patent: *Dec. 8, 2020

(54) SESSION INITIATION PROTOCOL (SIP) BASED USER INITIATED HANDOFF

(71) Applicant: INTERDIGITAL TECHNOLOGY CORPORATION, Wilmington, DE (US)

(72) Inventor: Kamel M. Shaheen, El-Shorouk (EG)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,449

(22) Filed: Jun. 13, 2016

(65) Prior Publication Data

US 2016/0295478 A1 Oct. 6, 2016

Related U.S. Application Data

(63) Continuation of application No. 11/000,314, filed on Nov. 30, 2004, now Pat. No. 9,369,496.

(Continued)

(51) Int. Cl.
*H04W 4/00* (2018.01)
*H04W 36/14* (2009.01)
(Continued)

(52) U.S. Cl.
CPC ....... *H04W 36/14* (2013.01); *H04L 29/06027* (2013.01); *H04L 41/026* (2013.01);
(Continued)

(58) Field of Classification Search
CPC ......... H04W 4/00; H04W 36/14; H04W 8/04; H04W 36/36; H04W 76/027;
(Continued)

(56) References Cited

U.S. PATENT DOCUMENTS 6,044,111 A 3/2000 Meyer et al.
6,446,127 B1 * 9/2002 Schuster ............... G06F 1/1632
                                                    709/227

(Continued)

FOREIGN PATENT DOCUMENTS

EP 1137236 A1 9/2001
GB 0321596 * 10/2003 ....... H04L 29/06027

(Continued)

OTHER PUBLICATIONS

Mitts et al. "Lossless Handover for Wireless ATM," Mobile Networks and Applications, vol. 1, pp. 299-312 (Oct. 1996).

(Continued)

*Primary Examiner* — Mahendra R Patel
(74) *Attorney, Agent, or Firm* — Volpe Koenig

(57) ABSTRACT

Method and apparatus for providing a solution to the handoff problem includes negotiation of new media codes (coders/decoders) for utilization in cases where the two devices involved in the handoff are incompatible. Although mobile IP (MIP) is presently utilized to perform handoff procedures, this technique lacks a trigger mechanism to initiate handoff between two different devices which communicate with two different networks or one common network. In addition, MIP does not address the issue of compatibilities between media types, codes and supported bit rate. The handoff utilizes a session protocol (SIP) message for handoff.

16 Claims, 5 Drawing Sheets

Related U.S. Application Data

(60) Provisional application No. 60/526,135, filed on Dec. 1, 2003.

(51) Int. Cl.

| | | |
|---|---|---|
| *H04L 29/06* | (2006.01) | |
| *H04W 36/36* | (2009.01) | |
| *H04W 80/10* | (2009.01) | |
| *H04L 29/12* | (2006.01) | |
| *H04W 36/00* | (2009.01) | |
| *H04L 12/24* | (2006.01) | |
| *H04L 12/741* | (2013.01) | |
| *H04L 12/58* | (2006.01) | |
| *H04W 8/04* | (2009.01) | |
| *H04W 28/18* | (2009.01) | |
| *H04W 88/02* | (2009.01) | |
| *H04W 76/18* | (2018.01) | |
| *H04W 4/16* | (2009.01) | |
| *H04W 84/12* | (2009.01) | |

(52) U.S. Cl.
CPC ........ *H04L 41/0681* (2013.01); *H04L 45/745* (2013.01); *H04L 51/10* (2013.01); *H04L 61/307* (2013.01); *H04L 61/605* (2013.01); *H04L 63/0892* (2013.01); *H04L 65/1006* (2013.01); *H04L 65/1083* (2013.01); *H04L 65/608* (2013.01); *H04W 8/04* (2013.01); *H04W 36/0011* (2013.01); *H04W 36/36* (2013.01); *H04W 80/10* (2013.01); *H04W 4/16* (2013.01); *H04W 28/18* (2013.01); *H04W 76/18* (2018.02); *H04W 84/12* (2013.01); *H04W 88/02* (2013.01)

(58) Field of Classification Search
CPC ..... H04W 80/10; H04W 84/12; H04W 28/18; H04L 29/06; H04L 45/745; H04L 41/026; H04L 65/608; H04L 29/06027; H04L 41/0681; H04L 65/1006; H04L 63/0892; H04L 61/605; H04L 51/10; H04L 12/56; H04L 12/28; H04L 65/1069; H04L 65/607; G06F 1/16; H04M 3/42; H04M 7/006; H04M 3/007; H04M 7/125
USPC ..... 455/417, 439, 435.1, 461; 370/331, 352, 370/432
See application file for complete search history.

(56) References Cited

U.S. PATENT DOCUMENTS

| | | | |
|---|---|---|---|
| 6,564,261 B1* | 5/2003 | Gudjonsson | H04L 12/1818 370/261 |
| 6,567,399 B1* | 5/2003 | Schuster | H04M 3/007 370/352 |
| 6,651,105 B1 | 11/2003 | Bhagwat et al. | |
| 6,661,799 B1* | 12/2003 | Molitor | H04L 29/12009 370/392 |
| 6,681,252 B1* | 1/2004 | Schuster | H04L 65/1006 709/227 |
| 6,744,759 B1* | 6/2004 | Sidhu | H04M 3/42 370/356 |
| 6,757,266 B1 | 6/2004 | Hundscheidt | |
| 6,904,025 B1 | 6/2005 | Madour et al. | |
| 6,917,611 B2 | 7/2005 | Dorenbosch et al. | |
| 6,931,249 B2 | 8/2005 | Fors et al. | |
| 7,089,008 B1 | 8/2006 | Back et al. | |
| 7,106,848 B1 | 9/2006 | Barlow | |
| 7,139,370 B1* | 11/2006 | Tse | H04L 29/06027 379/88.17 |
| 7,184,418 B1* | 2/2007 | Baba | H04L 29/06027 370/331 |
| 7,200,139 B1 | 4/2007 | Chu et al. | |
| 7,209,465 B2 | 4/2007 | Matsugatani et al. | |
| 7,233,980 B1* | 6/2007 | Holden | H04L 29/06027 379/265.01 |
| 7,269,163 B1* | 9/2007 | Koch | H04M 7/003 370/352 |
| 7,277,434 B2 | 10/2007 | Astarabadi et al. | |
| 7,492,728 B1 | 2/2009 | Stephens et al. | |
| 7,603,126 B2 | 10/2009 | Rosen et al. | |
| 7,929,470 B2* | 4/2011 | Minborg | H04L 29/06 370/300 |
| 8,077,634 B2* | 12/2011 | Maggenti | H04M 3/56 370/260 |
| 2002/0004800 A1* | 1/2002 | Kikuta | H04L 9/3231 715/255 |
| 2002/0027598 A1 | 3/2002 | Schneider | |
| 2002/0077136 A1* | 6/2002 | Maggenti | H04L 63/0428 455/518 |
| 2002/0085516 A1 | 7/2002 | Bridgelall | |
| 2002/0110113 A1 | 8/2002 | Wengrovitz | |
| 2002/0114317 A1* | 8/2002 | Dorenbosch | H04W 76/10 370/352 |
| 2002/0141404 A1* | 10/2002 | Wengrovitz | H04L 29/06027 370/389 |
| 2002/0147008 A1 | 10/2002 | Kallio | |
| 2002/0174423 A1 | 11/2002 | Fifield et al. | |
| 2002/0176405 A1* | 11/2002 | Aijala | H04M 15/00 370/352 |
| 2002/0198941 A1 | 12/2002 | Gavrilescu et al. | |
| 2003/0005280 A1* | 1/2003 | Bobde | H04L 29/06027 713/150 |
| 2003/0008643 A1* | 1/2003 | Hestir | H04M 3/436 455/417 |
| 2003/0013438 A1* | 1/2003 | Darby | H04L 67/04 455/419 |
| 2003/0021264 A1 | 1/2003 | Zhakov et al. | |
| 2003/0039228 A1 | 2/2003 | Shiu et al. | |
| 2003/0046404 A1* | 3/2003 | O'Neill | H04L 67/2804 709/228 |
| 2003/0073431 A1* | 4/2003 | Dorenbosch | H04M 1/006 455/417 |
| 2003/0088676 A1 | 5/2003 | Smith | |
| 2003/0088765 A1 | 5/2003 | Eschbach et al. | |
| 2003/0093462 A1* | 5/2003 | Koskelainen | H04L 65/4084 709/203 |
| 2003/0115463 A1* | 6/2003 | Wheeler | G06F 21/32 713/170 |
| 2003/0134638 A1 | 7/2003 | Sundar et al. | |
| 2003/0185202 A1 | 10/2003 | Maenpaa | |
| 2003/0212764 A1 | 11/2003 | Trossen et al. | |
| 2003/0217165 A1* | 11/2003 | Buch | H04L 29/06027 709/229 |
| 2004/0004942 A1* | 1/2004 | Nebiker | H04W 4/16 370/260 |
| 2004/0018829 A1 | 1/2004 | Raman et al. | |
| 2004/0022237 A1* | 2/2004 | Elliott | H04L 12/6418 370/356 |
| 2004/0028080 A1* | 2/2004 | Samarasinghe | H04L 29/06027 370/486 |
| 2004/0071129 A1* | 4/2004 | Doerr | H04L 29/06027 370/352 |
| 2004/0081159 A1* | 4/2004 | Pan | H04L 65/1069 370/395.2 |
| 2004/0095932 A1 | 5/2004 | Astarabadi et al. | |
| 2004/0137873 A1 | 7/2004 | Kauppinen et al. | |
| 2004/0139198 A1 | 7/2004 | Costa-Requena et al. | |
| 2004/0146021 A1 | 7/2004 | Fors et al. | |
| 2004/0176084 A1 | 9/2004 | Verma et al. | |
| 2004/0177145 A1 | 9/2004 | Bajko | |
| 2004/0184432 A1* | 9/2004 | Gateva | H04L 65/4084 370/349 |
| 2004/0246822 A1* | 12/2004 | Wong | H04M 3/4938 369/2 |
| 2004/0249951 A1* | 12/2004 | Grabelsky | H04L 29/06 709/227 |
| 2004/0264410 A1 | 12/2004 | Sagi et al. | |

(56) References Cited

U.S. PATENT DOCUMENTS

| | | | | |
|---|---|---|---|---|
| 2004/0264424 | A1* | 12/2004 | Hirsbrunner | H04W 36/0066 370/338 |
| 2005/0070288 | A1* | 3/2005 | Belkin | H04W 36/0066 455/439 |
| 2005/0078690 | A1* | 4/2005 | DeLangis | H04L 12/5692 370/401 |
| 2005/0117605 | A1* | 6/2005 | Yan | H04L 29/06027 370/469 |
| 2005/0254469 | A1 | 11/2005 | Verma et al. | |
| 2007/0133463 | A1 | 6/2007 | Hori et al. | |
| 2007/0195732 | A1 | 8/2007 | Akram et al. | |

FOREIGN PATENT DOCUMENTS

| | | |
|---|---|---|
| JP | 2002-031677 | 1/2002 |
| JP | 2003-258879 A2 | 9/2003 |
| JP | 2003-304251 | 10/2003 |
| JP | 2005-064686 | 3/2005 |
| KR | 2003-0071400 | 9/2003 |
| KR | 10-0402787 | 10/2003 |
| RU | 2005110767 | 10/2006 |
| WO | 99/48312 | 9/1999 |
| WO | 00/64061 | 10/2000 |
| WO | 00/74420 | 12/2000 |
| WO | 470275 | 12/2001 |
| WO | 2002/31669 A1 | 4/2002 |
| WO | 2002/33938 A2 | 4/2002 |
| WO | 2002/35790 A1 | 5/2002 |
| WO | 02/45452 | 6/2002 |
| WO | 02/47427 | 6/2002 |
| WO | 02/103951 | 12/2002 |
| WO | 03/039080 | 5/2003 |
| WO | 03/054721 | 7/2003 |
| WO | 2005/027563 A1 | 3/2005 |

OTHER PUBLICATIONS

Schulzrinne et al. "Application-Layer Mobility Using SIP." Mobile Computing and Communications Review, ACM, vol. 1, No. 2, pp. 1-9 (Dec. 31, 2000).

"Session Initiation Protocol (SIP)", An Alcatel Executive Brief, Aug. 2002, Copyright 2002 Alcatel Internetworking (9 pages).

Abarca et al. "Service Architecture, Version 5.0." Internet Citation, Jun. 16, 1997, pp. 140-144 http://www.tinac.com/specifications/documents/sa/50-main.pdf.

Banerjee et al., "Mobility Support in Wireless Internet," IEEE Personal Communications, vol. 10, No. 5, pp. 54-61 (Oct. 2003).

Biggs et al., "SIP Call Control: Call Handoff; draft-dean-handoff-00.txt," IETF Standard-Working-Draft, Internet Engineering Task Force (Jan. 2001).

Chimura et al., "SIP text," IDG Information Communication Series, First edition, pp. 72-77 (May 2, 2003).†.

Garcia-Martin, "3$^{rd}$-Generation Partnership Project (3GPP) Release 5 requirements on the Session Initiation Protocol (SIP); draft-ietf-sipping-3gpp-r5-requirements-00.txt," IETF Standard-Working-Draft, Internet Engineering Task Force (Oct. 2002).

Goto et al., "A Study on the Authentication methods for a Service Continuation," Proceedings of the Society Conference of IEICE 2003 Communications, p. 123 (Sep. 10, 2003). †.

Handley et al., "SIP: Session Initiation Protocol," Network Working Group, Request for Comments: 2543 (Mar. 1999).

Hirooka et al., "Audio Stream Encryption System for Secure IP Telephony," ITE Technical Report, vol. 27, No. 51, pp. 31-36 (Sep. 25, 2003). ††.

Izumikawa et al., "SIP-Based Bicasting for Seamless Handover Between Heterogeneous Networks," Internet Draft, Nov. 2007. http://tools.ietf.org/wg/sipping/draft-izumikawa-sipping-sipbicast-01.txt.

Jimenez et al., "Design and Implementation of Synchronization and AGC for OFDM-based WLAN Receivers," IEEE Transactions on Consumer Electronics, vol. 50, No. 4, pp. 1016-1025 (Nov. 30, 2004).

Kristiansen, "Service Architecture Version 5.0," Telecommunications Information Networking Architecture Consortium, pp. 140-144 (Jun. 1997).

Mahy et al., "The Session Initiation Protocol (SIP) "Replaces" Header; draft-ietf-sip-replaces-04.txt," IETF Standard-Working-Draft, Internet Engineering Task Force (Jun. 2003).

Mitts et al. "Lossless Handover for Wireless ATM." International Conference on Mobile Computing and Networking Mobicom. Nov. 11, 1996, pp. 85-96.

Nakajima et al. "Handoff Delay Analysis and Measurement for SIP Based Mobility in IPv6." IEEE International Conference on Communication, vol. 2, May 11-15, 2003, pp. 1085-1089.

Niccolini et al., "Requirements for Vertical Handover of Multimedia Sessions Using SIP," Internet Draft, Aug. 2007. http://tools.ieff.org/html/draft-niccolini-sipping-siphandover-01.

Schulzrinne et al. "Application-Layer Mobility Using SIP." IEEE Service Portability and Virtual Customer Environments, pp. 29-36 (2000).

Schulzrinne et al. "Application-Layer Mobility Using SIP." Mobile Computing and Communications Review, ACM, vol. 4, No. 3, Jul. 2000, pp. 47-57.

Sparks, "Session Initiation Protocol Call Control—Transfer; draft-ietf-sipping-cc-transfer-01," IETF Standard-Working-Draft, Internet Engineering Task Force (Feb. 2003).

Sparks, "The Session Initiation Protocol (SIP) Refer Method;," IETF Standard-Working-Draft, Internet Engineering Task Force (Apr. 2003).

Third Generation Partnership Project, "Technical Specification Group Services and System Aspects; IP Multimedia Subsystem (IMS); Stage 2 (Release 5)," 3GPP TS 23.228 V5.10.0 (Apr. 2004).

Third Generation Partnership Project, "Technical Specification Group Services and System Aspects; IP Multimedia Subsystem (IMS); Stage 2 (Release 5)," 3GPP TS 23.228 V5.12.0 (Sep. 2003).

Third Generation Partnership Project, "Technical Specification Group Services and System Aspects; IP Multimedia Subsystem (IMS); Stage 2 (Release 6)," 3GPP TS 23.228 V6.3.0 (Sep. 2003).

Third Generation Partnership Project, "Technical Specification Group Services and System Aspects; IP Multimedia Subsystem (IMS); Stage 2 (Release 6)," 3GPP TS 23.228 V6.7.0 (Sep. 2004).

Vakil et al., "Mobility Management in a SIP Environment Requirements, Functions and Issues; draft-itsumo-sipping-mobility-req-00.txt," IETF Standard-Working-Draft, Internet Engineering Task Force (Jul. 2001).

Vidal et al. "Radiochannel Emulation and Multimedia Communications Handover Support in an Experimental WATM Network." Eurice '99—Fifth Eurice Open European Summer School, Sep. 1, 1999, pp. 1-6.

Akram et al., "Method for Releasing Allocated Resources at SIP Handover," PUN-NO GB000321596D0, Matsushita Electric Ind. Co., Ltd., p. 1 (abstract) (Oct. 15, 2003).

Ikuzaki, "Easy Internet without Cable—How to Reliably Install Wireless LAN," Nikkei PC 21, vol. 7, No. 21, pp. 83-96 (Nov. 11, 2002).

Nakamura et al., "Current State of TCP/IP and Whole Picture of VoIP Technology Chapter 3: VoIP Signaling Protocols—Realities of Signaling Using SIP," Interface, vol. 29, No. 6, pp. 79-89 (Jun. 1, 2003).

Handley et al., "SIP: Session Initiation Protocol," Internet Engineering Task Force, Internet Draft (Jul. 31, 1997).

\* cited by examiner

SESSION INITIATION PROTOCOL (SIP) BASED USER INITIATED HANDOFF

CROSS REFERENCE TO RELATED APPLICATIONS

This application is a continuation of U.S. patent application Ser. No. 11/000,314, filed Nov. 30, 2004, which claims the benefit of U.S. provisional Patent Application Ser. No. 60/526,135, filed Dec. 1, 2003, which are incorporated by reference as if fully set forth.

FIELD OF INVENTION

The present invention relates to performing a handoff between two devices which employ different technologies and which are connected to an internet protocol (IP) network by way of two different systems. More particularly, the present invention is related to a method and apparatus for performing a handoff employing SIP protocol conducted during real time sessions between such different devices, and either such different networks or a common network.

BACKGROUND

Session initiation protocol (SIP) protocol is employed to initiate and to modify a multimedia session over the internet protocol (IP) network. For example, SIP is used in one of a universal mobile telecommunications system (UMTS) network to establish a multimedia session between two users wherein at least one of the users operates on the UMTS system. However, SIP protocol has not heretofore been utilized as a mechanism to perform handoff between different devices operating in different systems.

SUMMARY

The present invention is characterized by method and apparatus for providing a unique solution to the handoff problem including negotiation of new media codecs (coders/decoders) for utilization in cases where the two devices involved in the handoff are incompatible. Although mobile IP (MIP) is presently utilized to perform handoff procedures, this technique lacks a trigger mechanism to initiate handoff between two different devices which communicate with two different networks or one common network. In addition, MIP does not address the issue of compatibilities between media types, codecs and supported bit rate.

BRIEF DESCRIPTION OF THE DRAWINGS

The present invention will be understood from a consideration of the accompanying figures wherein like elements are designated by like numerals and, wherein.

DETAILED DESCRIPTION OF THE PREFERRED EMBODIMENTS

Figure 1:
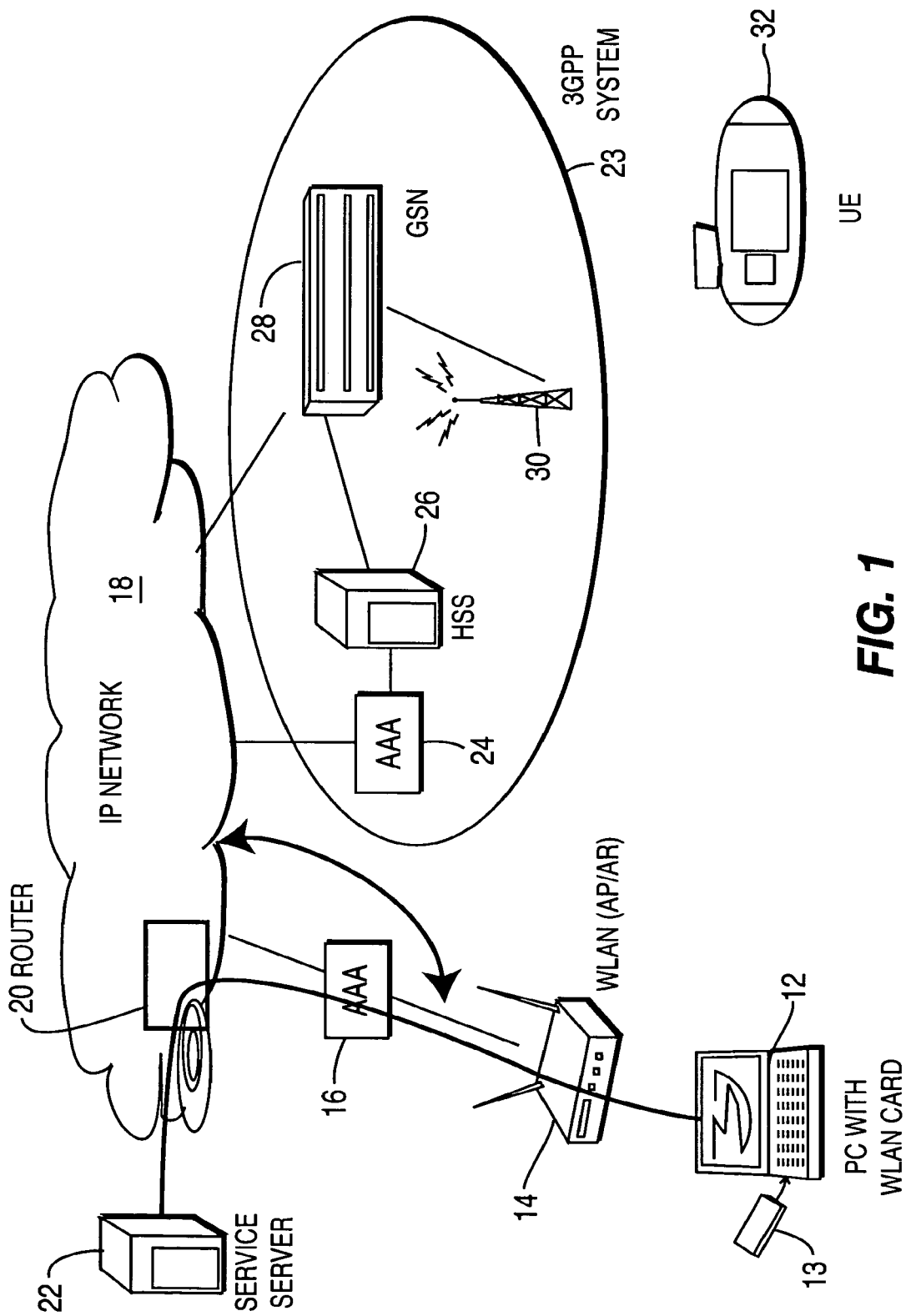
FIG. 1 is a simplified schematic diagram of a network architecture incorporating two incompatible devices and two different systems communicating with said devices.

Making reference to the network architecture 10 of FIG. 1 there is shown therein two different wireless devices 12 and 32, device 12 being a personal computer (PC) having a WLAN card 13 enabling the device 12 to establish a wireless communication with a WLAN access point/access router (AP/AR) 14. PC 12 may be a desktop or laptop and is fitted with a WLAN card 13 and is able to establish a wireless communication with WLAN 14, through a suitable interface (not shown for purposes of simplicity). PC 12 is coupled to the AAA unit 16 through WLAN 14 to establish access, authorization and accounting (AAA) at 16 and is coupled through internet protocol (IP) network 18 and router 20 to a service server 22 in order to communicate with a called subscriber or other source (not shown) in the network, for example.

User equipment (UE) 32, which may be a wireless cell phone, PDA wireless device or other like device having similar capabilities, is adapted for wireless communication with a third generation partnership project (3 GPP) system 23. UE 32 communicates with the system 23 which receives a wireless message from UE 32 over antenna 30 that couples the communication to a general packet radio service (GPRS) support node (GSN) 28. The message is also conveyed from GSN 28 to a home subscriber server (HSS) 26 and an AAA 24 (similar to AAA 16) for access, authentication and accounting. The home subscriber server (HSS) 26 performs a number of database functions such as the home location register (HLR) function, which provides routing information for mobile terminated calls and short message service and maintains user subscription information which is distributed to the relevant visitor location register (VLR), not shown for purposes of simplicity, or is distributed to the serving GPRS support node (SGSN). The AAA 24 securely determines the identity and privileges of the UE and tracks the UE's activities.

A description will now be provided for performing a handoff using SIP when a user wishes to handoff an existing multimedia session between two different types of networks. The two different networks of the example to follow are a WLAN network 14 and a 3GPP UMTS network 23. The handoff will be described as from a PC, such as the PC 13 shown in FIG. 1 and equipped with a WLAN card 13, to a user equipment (UE) 32 which may be a cell phone or the like which optionally may also be equipped with image reception and display capability, to accommodate a multimedia session in accordance with the 3GPP standards.

Figure 2:
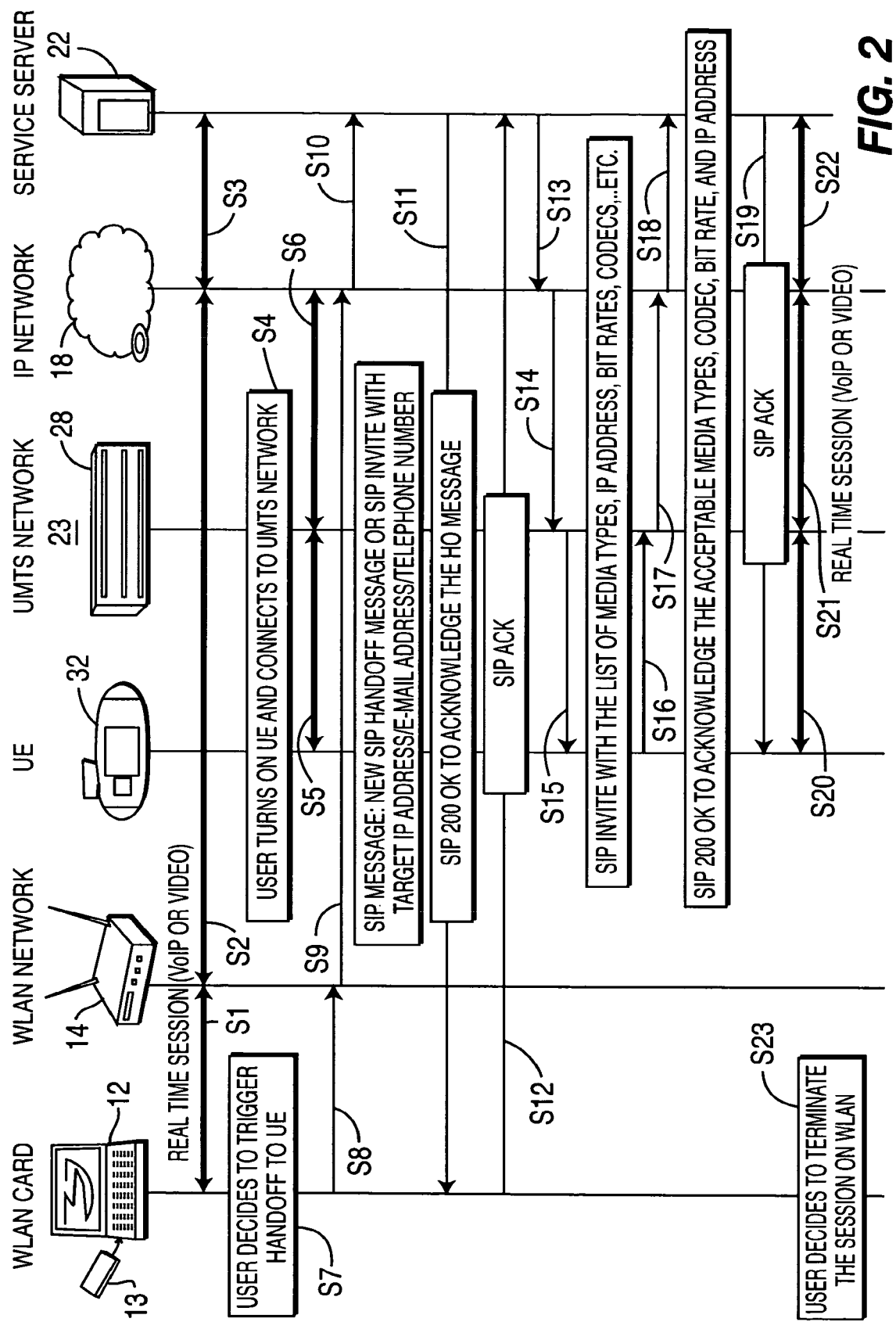
FIG. 2 is a flow diagram showing the manner in which a handoff from a wireless local area network (WLAN) network user to a UMTS network user is triggered from the WLAN network.

Making reference to FIG. 2, in which a handoff is triggered by the WLAN network 14, it is assumed that there is a real time session between PC 12 and a called party which is represented in FIG. 1 as a real time session in which PC 12/WLAN card 13 communicates with WLAN network 14 shown at S1, WLAN network 14 communicating with IP network 18, shown at S2, the IP network 18, in turn providing the two-way communication between the PC 12 and service server 12, shown at S3. At this time neither UE 32 nor PC 12 is communicating with UMTS network 23.

The user of both PC 12 and UE 32 turns on UE 32 and establishes a connection with the UMTS network 23, at, S4, S5 and S6. The user then decides to trigger a handoff from PC 12 to the UE 32 at S7 and communicates this handoff request, at S8, to the WLAN network 14. WLAN network 14, at S9, transmits an SIP message, which may either take the form of a SIP handoff message or a SIP invite accompanied with either a target IP address or an email address or a telephone number. This is conveyed through IP network 18, at S10, to service server 22. Service server 22 transmits an SIP 200 (OK) message, at S11, to acknowledge the handoff(HO) message.

WLAN-equipped PC 12, receives the SIP 200 OK acknowledgement and, at S12, sends an SIP acknowledgement (ACK) to service server 22. Service server 22 transmits an SIP invite setting forth a list of media types, IP addresses, bit rates, codecs and the like, at S13 which, in turn, is conveyed through IP network 18 to UMTS network 23 at S14 and, in turn, from UMTS network 23 to UE 32, at S15. UE 32, upon receipt of the SIP invite, at S16, transmits an SIP 200 OK message acknowledging the acceptable media types, codecs, bit rate and IP address. This is transferred through UMTS network 23 to IP network 18 at S17, the IP network 18 conveying this message to service server 22, at S18. Service server 22, upon receipt of the SIP 200 OK from UE 32, at S19, conveys an SIP acknowledge (ACK) to UE 32, thereby completing the handoff of the real time session from the WLAN—capable PC 12 to UE 32, the communication of the real time session now being established between UE 32 and a given source through UMTS network 23, at S20, network 23 conveying this two-way communication to IP network 18 at S21 and IP network 18 conveying this two-way communication between IP network 18 and service server 22, at S22. The user terminates the session between PC 12 and WLAN network 14, at S23.

Figure 3:
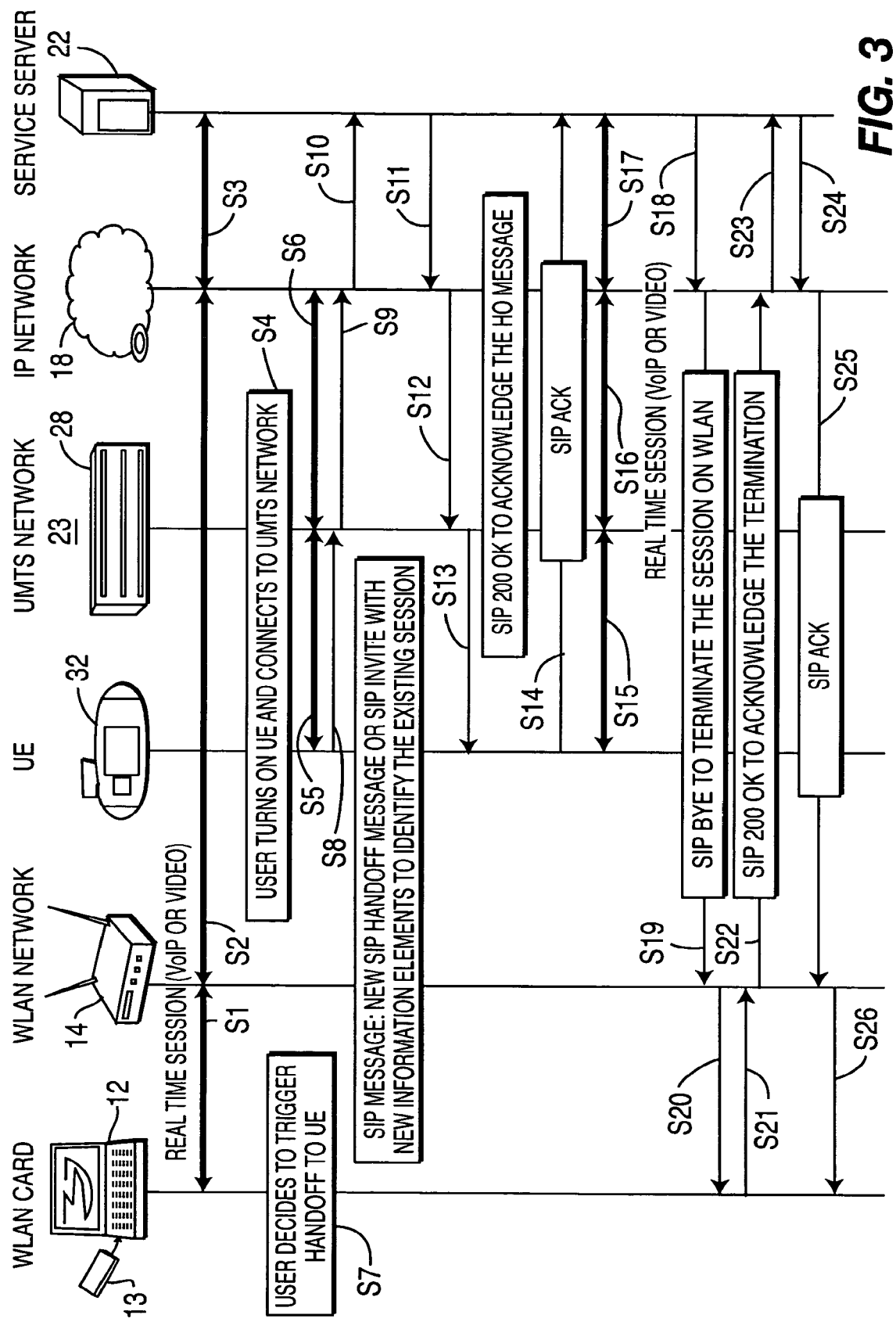
FIG. 3 is a flow diagram showing the manner in which a handoff from a WLAN network user to a UMTS network user is triggered from a UMTS network.

FIG. 3 shows the manner in which a handoff from a PC 12 to a UE 32 is triggered from the UMTS network.

Initially, it is assumed that the real time multi-media session, which may be voice over internet protocol (VoIP) or video, is presently taking place as represented by the two-way communication S1 between PC 12 with WLAN card 13 and WLAN network 14 as represented by step S1, two-way communication of this session between WLAN network 14 and IP network 18 shown at S2 and two-way communication between IP network 18 and service server 22, being shown at S3. It is assumed that the user wishes to perform a handoff from PC 12 to UE 32. This is initiated by turning on UE 32, at S4, so as to connect UE 32 to the UMTS network as shown at S5 and to the IP network 18, as shown at S6.

Once the connection with UE 32 is established and the user decides to trigger a handoff to UE 32, at S7, the UE 32, at S8 sends an SIP message which may either be a new SIP handoff message or an SIP invite message with new information elements to identify the existing session. This message is transferred through UMTS network 23 to IP network 18, at S9, and thereafter to service server 22, at S10. Service server 22, upon receipt of the SIP message, transmits an SIP 200 OK to acknowledge the HO message which is conveyed, at S11, to IP network 18 which then conveys this message, at S12 to UMTS network 23, which, in turn conveys the SIP 200 OK message to UE 32 at S13.

UE 32, at S14, responds to the SIP 200 OK message by sending an SIP acknowledge to the service server 22 thereby establishing the real time session, which originally included PC 12 as a participant, to UE 32 as shown at S15, S16 and S17. It should be noted that steps S15, S16 and S17 are substantially the same as steps S20, S21 and S22 shown in FIG. 2.

After completing the handoff, service server 22, at S18 transmits an SIP BYE to terminate the real time session on the WLAN network. This is conveyed to IP network 28 at step S18, which in turn conveys the message to WLAN network 14, at S19 which, in turn, conveys the message to the PC 12, at S20.

PC 12, equipped with the WLAN card 13, sends an SIP 200 OK response to acknowledge the termination, which response is conveyed to WLAN network 14 at S21 and is, in turn, conveyed to IP network 18 at S22. The IP network 18, in turn, conveys the SIP 200 OK message to service server 22 at S23. Upon receipt of this message, the service server 22 sends an SIP acknowledge (SIP ACK) which is initially conveyed to IP network 18, at S24, which transfers the SIP ACK message to WLAN 14 at S25, WLAN network 14 transferring the SIP ACK message to PC 12 with WLAN card 13, at S26.

Figure 4:
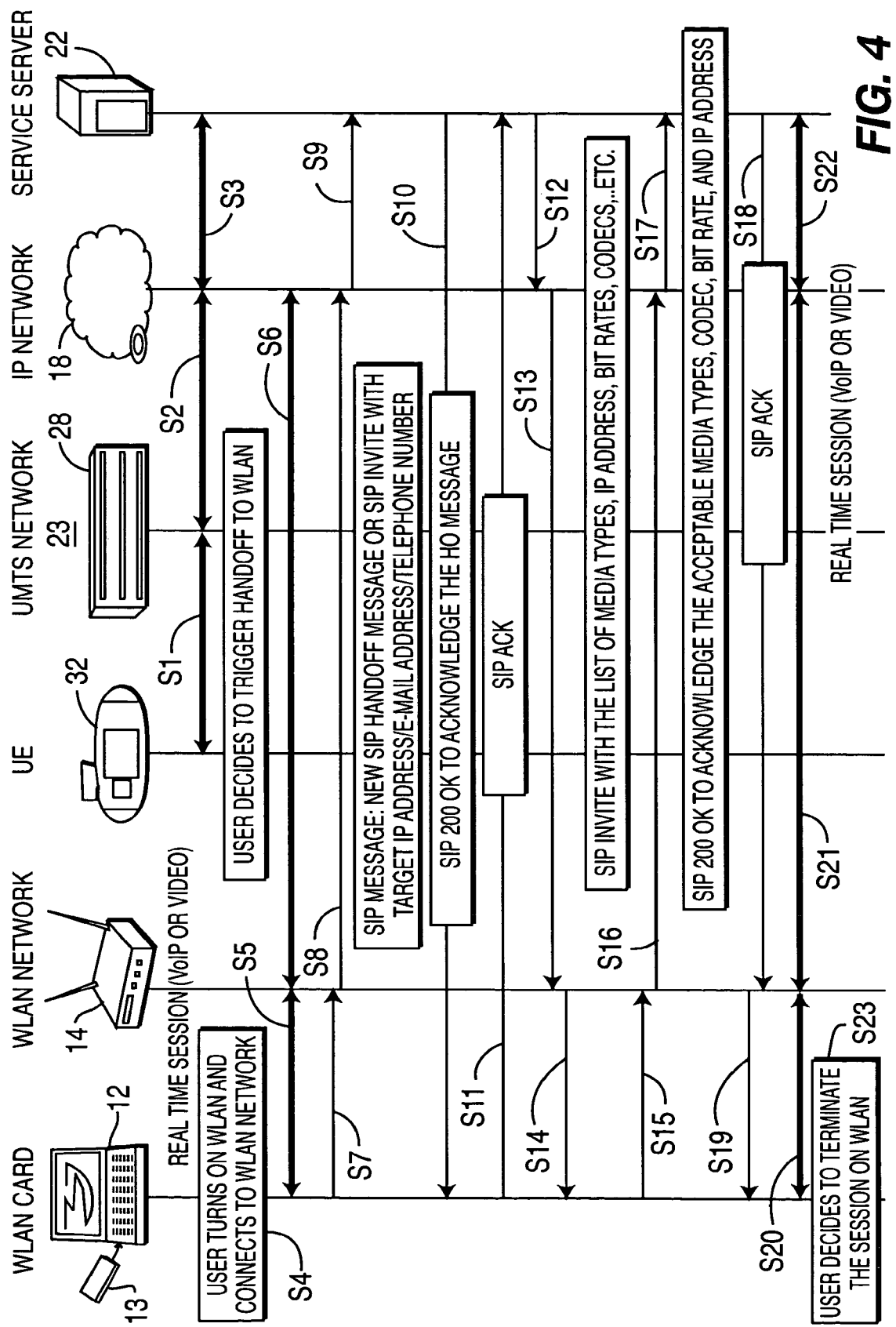
FIG. 4 is a flow diagram similar to that of FIG. 2 wherein the handoff is made from the UMTS user to the WLAN network user and is triggered from the WLAN network.

Making reference to FIG. 4, in which handoff is triggered from the WLAN network 14, it is assumed that there is a real time session between UE 32 and a remote party which is represented as a real time session in which UE 32 communicates with UMTS network 23 shown at S1, UMTS network 23 communicating with IP network 18, shown at S2, the IP network 18, in turn providing the two-way communication between the UE 32 and a called subscriber through service server 12, shown at S3.

The user, at S4, turns on PC 12 and establishes a connection with the WLAN network, at S5, and IP network 18, at S6. The user then decides to trigger a handoff to the PC 12, at S7, and communicates an SIP handoff request, at S8, to the IP network 18, and service server 22, at S9. The SIP message, may either take the form of a SIP handoff message or a SIP invite accompanied with either a target IP address or an email address or a telephone number. This is conveyed through IP network 18, at S9, to service server 22. Service server 22 transmits an SIP 200 (OK) message to PC 12, at S10, to acknowledge the handoff (HO) message. WLAN-equipped PC 12, receives the SIP 200 (OK) acknowledgement and, at S11, sends an SIP acknowledgement (ACK) to service server 22. Service server 22 transmits an SIP invite setting forth a list of media types, IP addresses, bit rates, codecs and the like, at S12, which, in turn, is conveyed through IP network 18 to WLAN network 14, at S13, and, in turn, from WLAN network 14 to PC 12, at S14. PC 12, upon receipt of the SIP invite, at S15, transmits an SIP 200 OK message to WLAN 14 acknowledging the acceptable media types, codecs, bit rate and IP address. The SIP 200 OK is transferred to IP network 18 through WLAN network 14, at S16, and through IP network 18 to server 22, at S17. Service server 22, upon receipt of the SIP 200 OK from PC 12, at S18, conveys an SIP acknowledge (ACK) to WLAN 14 and then to PC 12, through WLAN network 14, at S19, thereby completing the handoff of the real time session from the UE 32 to the WLAN—capable PC 12. The communication of the real time session is thus established between PC 12 and a given source through WLAN network 14 and IP network 18. The two-way communication is between WLAN network 14 and PC 12 at S20, IP network 18 at S21, and between IP network 18 and service server 22, at S22. The user may terminate the session on WLAN 14, at step S23.

Figure 5:
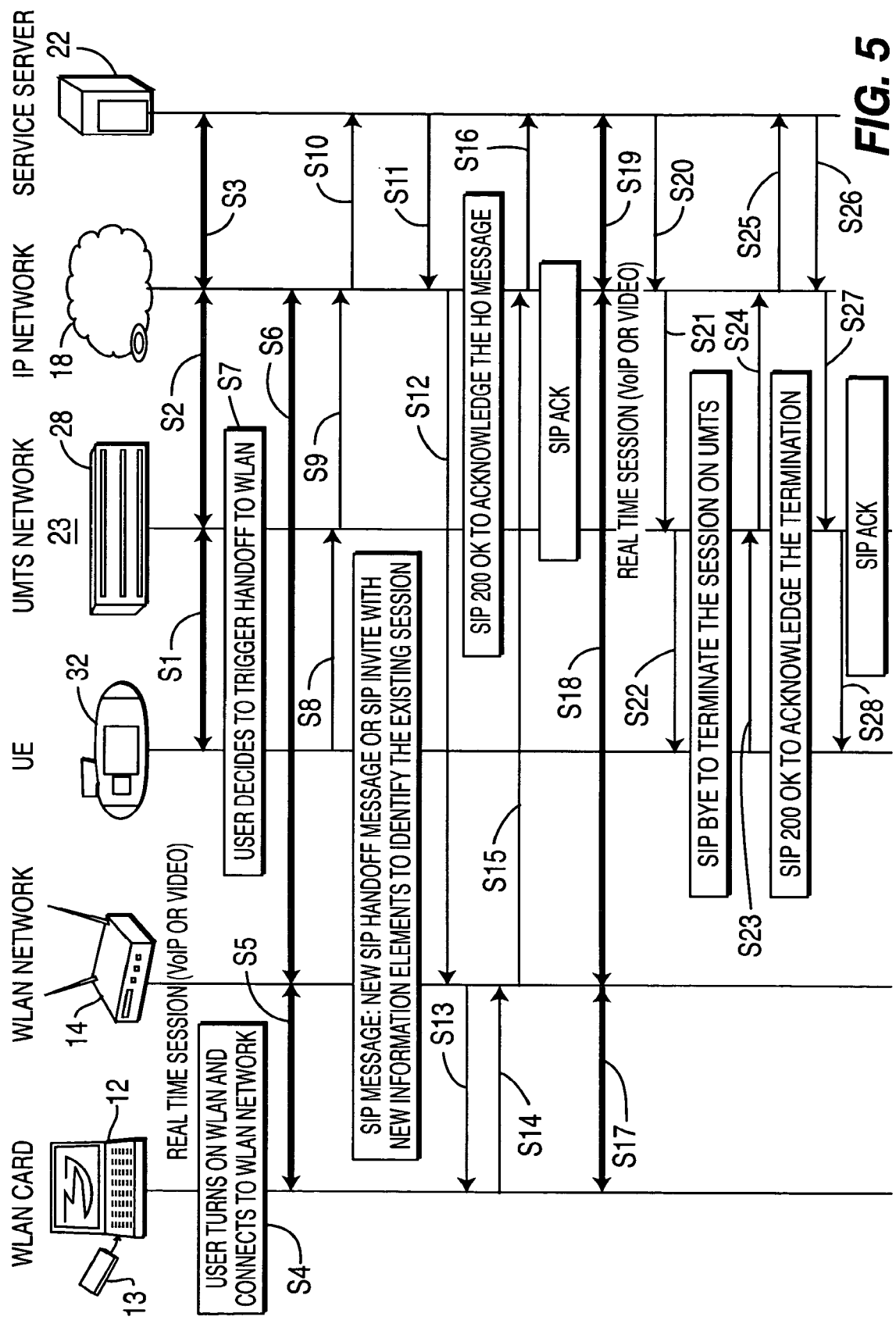
FIG. 5 is a flow diagram similar to that shown in FIG. 3 wherein the handoff is made from a WLAN network user to a UMTS network user and is triggered from the UMTS network.

FIG. 5 shows the manner in which a handoff from a UE 32 to a PC 12 is triggered from the UMTS network 23.

Initially, it is assumed that the real time multi-media session, which may be voice over internet protocol (VoIP) or video, is presently taking place as represented by the two-way communication between UE 32 and UMTS network 23 as represented by step S1, two-way communication of this session between UMTS network 23 and IP network 18 shown at S2 and the two-way communication between IP network 18 and service server 22 being shown at S3. It is assumed that the user wishes to perform a handoff from UE 32 to PC 12. This is initiated by turning on PC 12, at S4, so as to connect PC 12 to the WLAN network 14, as shown at S5, and to the IP network 18, as shown at S6.

Once the connection with PC 12 is established and the user decides, at S7, to trigger a handoff to PC 12, the UE 32, at S8, sends an SIP message which may either be a new SIP handoff message or an SIP invite message with new information elements to identify the existing session. This message is transferred through network 23 to IP network 18, at S9, and thereafter to service server 22, at S10. Service server 22, upon receipt of the SIP message, transmits an SIP 200 OK message to acknowledge the HO message which is conveyed, at S11, to IP network 18 which then conveys this message, at S12, to WLAN network 14, which, in turn conveys the SIP 200 OK message to PC 12 at S13.

PC 12, at S14, responds to the SIP 200 OK message by sending an SIP acknowledge (ACK) to the service server 22 through WLAN network 14, at S14, IP network 18, at S15 and then from IP network 18 to service server 22 at S16, thereby establishing the real time session, which originally included UE 32 as a participant, and is now handed off to PC 12 as shown at S17, S18 and S19.

Service server 22, at S20, sends an SIP BYE to IP network which conveys it to UMTS network 23 at S21, which at S22 conveys it to UE 32. UE 32 sends an SIP 200 OK response to acknowledge the termination, which response is conveyed to UMTS network 23 at S23 and is, in turn, conveyed to IP network 18 at S24, which, in turn, conveys the SIP 200 OK message to service server 22 at S25. Upon receipt of this message, the service server 22 sends an SIP acknowledge (SIP ACK) which is initially conveyed to IP network 18, at S26, which transfers the SIP ACK message to UMTS 23, at S27, UMTS network 23 transferring the SIP ACK message to UE 32, at S28.

What is claimed is:

1. A communication device comprising:
    circuitry configured to:
        establish a network connection via a wireless local area network (WLAN);
        generate a session initiation protocol (SIP) INVITE message including an email address of a user of a remote device, the message indicating acceptable media types and codecs; and
        transmitting the SIP INVITE message, via the WLAN to a server over a communication network,
        wherein the server exchanges video information with the remote device and with the communication device based on the SIP INVITE to establish a real time video communication session with the communication device and the remote device based on the email address and video codec responsive to the transmitted SIP INVITE message.

2. The communication device of claim 1 wherein the circuitry is configured to receive a second message in response to the SIP INVITE message.

3. The communication device of claim 2 wherein the second message is a SIP message.

4. The communication device of claim 1 wherein the SIP INVITE message further indicates an Internet Protocol (IP) address or a telephone number.

5. The communication device of claim 1 wherein the communication session comprises video and the acceptable media types and codecs are a video media type and at least one video codec.

6. The communication device of claim 1 wherein the communication device is a mobile UE.

7. The communication device of claim 1 wherein the SIP INVITE message is sent to a service server.

8. A method for use in a communication device for establishing a communication session with a remote device, the method comprising:
    establishing a network connection via a wireless local area network (WLAN);
    generating a session initiation protocol (SIP) INVITE message including an email address of a user of the remote device, the message indicating acceptable media types and codecs; and
    transmitting the SIP INVITE message, via the WLAN, to a server over a communication network,
    wherein the server exchanges video information with the remote device and with the communication device based on the SIP INVITE to establish a real time video communication session with the communication device and the remote device based on the email address and video codec responsive to the transmitted SIP INVITE message.

9. The method of claim 8 further comprising receiving a second message in response to the SIP INVITE message.

10. The method of claim 9 wherein the second message is a SIP message.

11. The method of claim 8 wherein the SIP INVITE message further indicates an Internet Protocol (IP) address or a telephone number.

12. The method of claim 8 wherein the communication session comprises video and the acceptable media types and codecs are a video media type and at least one video codec.

13. The method of claim 8 wherein the communication device is a mobile UE.

14. The method of claim 8 wherein the SIP INVITE message is sent to a service server.

15. The communication device of claim 1 wherein the real-time communication session is established in response to a SIP acknowledge (SIP ACK) message to the service server.

16. The communication device of claim 1 wherein the real-time communication session is terminated in response to a SIP BYE message.

* * * * *